United States Patent
Judd et al.

[11] 3,904,950
[45] Sept. 9, 1975

[54] RECTIFIER CIRCUIT

[75] Inventors: Frank Fuller Judd, Madison; Helmut Wilhart, Whippany, both of N.J.

[73] Assignee: Bell Telephone Laboratories, Incorporated, Murray Hill, N.J.

[22] Filed: Jan. 27, 1975

[21] Appl. No.: 544,234

[52] U.S. Cl. .................. 321/27 R; 321/47
[51] Int. Cl.² ................................... H02M 7/23
[58] Field of Search ............ 307/254; 321/27 R, 47, 321/8

[56] References Cited
UNITED STATES PATENTS

| | | | |
|---|---|---|---|
| 2,953,738 | 9/1960 | Bright | 321/47 |
| 3,083,328 | 3/1963 | Mallery et al. | 321/47 X |
| 3,235,753 | 2/1966 | Gaunt, Jr. | 307/254 |
| 3,581,186 | 5/1971 | Weinberger | 321/47 X |
| 3,582,758 | 6/1971 | Gunn | 321/47 |
| 3,735,235 | 5/1973 | Hamilton et al. | 321/47 X |
| 3,737,756 | 6/1973 | Hasley et al. | 321/27 R X |

FOREIGN PATENTS OR APPLICATIONS 176,133   8/1961   Sweden .................. 321/47

OTHER PUBLICATIONS

RCA Technical Notes, "High Efficiency Low Voltage Rectifier," John L. Lowrance, RCA TN No. 627, August 1965.

*Primary Examiner*—William M. Shoop
*Attorney, Agent, or Firm*—J. S. Cubert

[57] ABSTRACT

A rectifier includes a plurality of parallel regeneratively coupled transistor circuits to handle large currents with improved efficiency. Each circuit transistor is coupled to the load through a transformer primary winding. The circuit transformer secondary winding is coupled to the base of the succeeding circuit transistor and the transformer secondary winding of the last of the parallel circuits is coupled to the base of the first circuit transistor. All the transistor circuits are regeneratively coupled, thereby assuring conduction of all parallel circuits and load sharing among the parallel circuits.

14 Claims, 5 Drawing Figures

FIG. 2

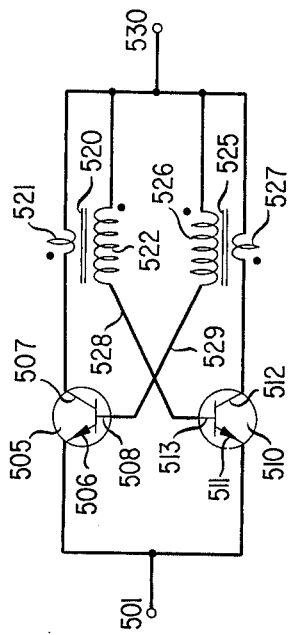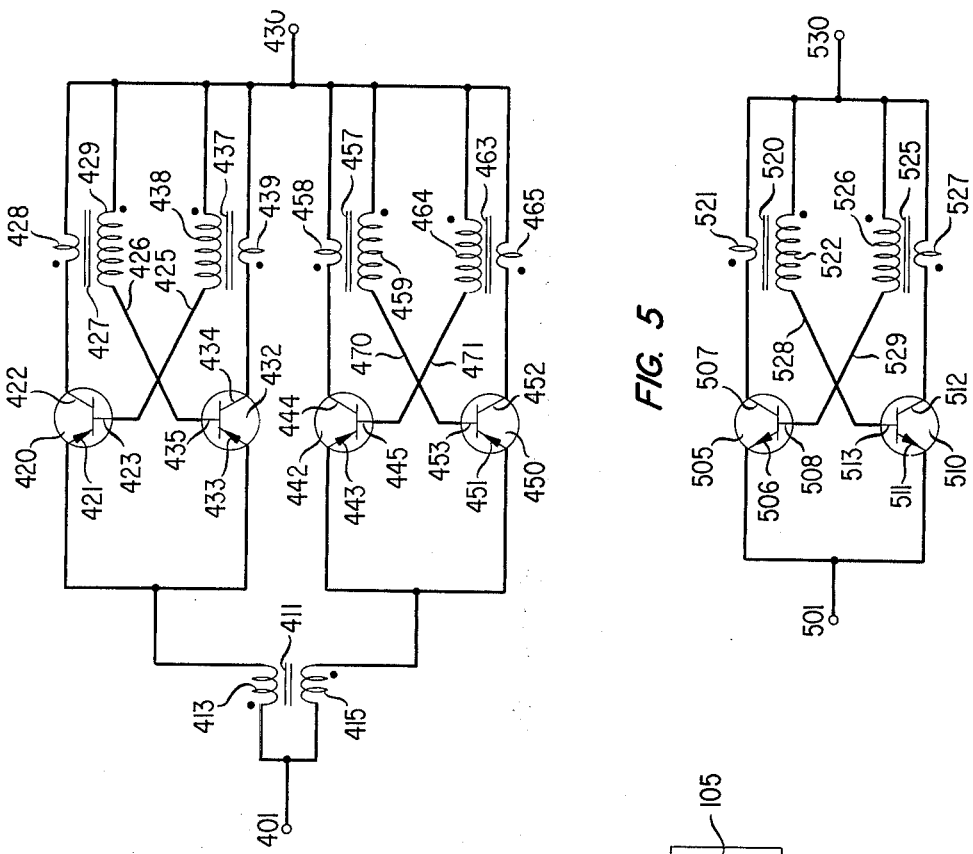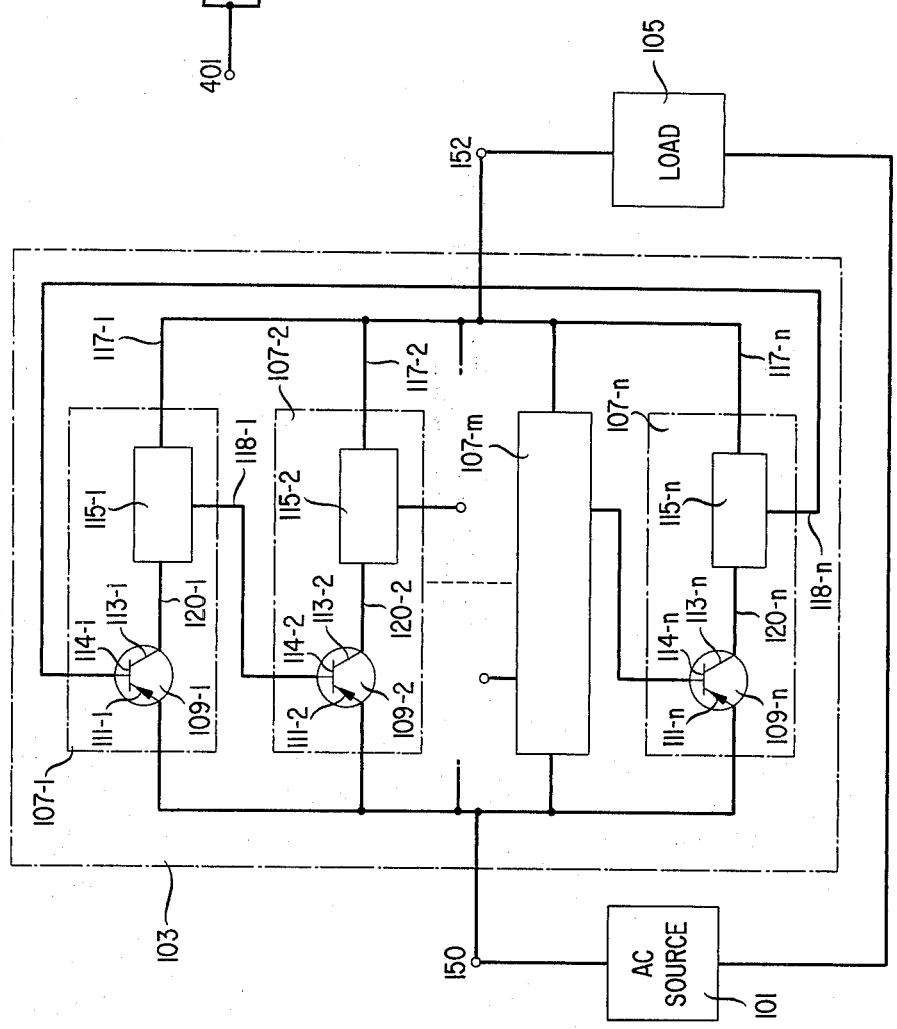

RECTIFIER CIRCUIT

BACKGROUND OF THE INVENTION

Our invention relates to power system rectifier circuits and more particularly to current sharing arrangements for paralleled rectifier devices.

A power source supplying d.c. voltage to a load generally includes rectifier devices to convert the supplied or generated a.c. voltage to a pulsating d.c. voltage, which d.c. pulsating voltage is then filtered. The output obtainable from a power supply is often limited by the maximum current and maximum power ratings of the supply rectifier devices. An increase in the power supply current capacity and efficiency can be obtained by connecting a plurality of rectifier devices in parallel provided that the rectifier arrangement assures sharing of the total load current among the paralleled rectifier devices.

It is well known that controllable switches, such as transistors, may be used in a rectifier circuit to minimize the voltage drop across the rectifier and thereby increase the supply efficiency. It is also known to include regenerative coupling between the output and control electrodes of such a transistor rectifier so that maximum transistor conduction can be obtained. Transformers are readily adaptable to provide regenerative coupling. The paralleling of a plurality of such regenerative transistor rectifier circuits, however, does not necessarily result in the load current sharing. Differences between transistors may result in one transistor conducting the entire load current while the other paralleled transistors remain nonconductive. Even if the transistors are identical, saturation of the regenerative coupling transformers or differences between said transformers may result in either very poor or no load current sharing. In the event that one of the paralleled transistors conducts too heavily, the increased power dissipation can result in the overload of the conducting transistor and sequential failure of all paralleled rectifier transistors whereby the power supply is rendered inoperative.

One prior art arrangement to ensure load current sharing between a pair of transistors is described in U.S. Pat. No. 3,737,756, issued June 5, 1973, to A. D. Hasley et al and assigned to the same assignee. The arrangement includes the use of a differential transformer having a first winding in series with a first transistor collector, and a second winding in series with a second transistor collector. A third winding is placed in the emitter base circuit of the first transistor, while a fourth winding is placed in series with the emitter base circuit of the second transistor. Unbalance in the transistor collector currents is detected by the differentially arranged first and second windings, and equal and opposite corrective signals are supplied via the third and fourth windings to the emitter base circuits of each transistor. Such an arrangement requires special transformer construction and highly accurate transformer tolerances so that the corrective signals are appropriate to balance the transistor collector currents. The special differential transformer arrangement is then only useful in providing load sharing between a single pair of transistors. It is therefore an object of the invention to provide an improved economical rectifier arrangement in which load current is shared among a plurality of paralleled rectifier devices.

BRIEF SUMMARY OF THE INVENTION

In accordance with the invention, a rectifier circuit having a plurality of parallel branches is coupled between a source and a load. Each branch comprises a controllable rectifier device having an input, an output, and a control electrode, and a coupling device having an input section connected between the rectifier device output and the load. The coupling device output section couples a portion of the branch rectifier output to the control electrode of the succeeding one of the plurality of branches. The coupling device output of the last branch is coupled to the control electrode of the first branch, whereby the conduction in each branch is responsive to the conduction of the other branches.

In accordance with one aspect of the invention, each branch coupling device comprises a transformer having a primary winding serially connected to the rectifier device output. A secondary winding of the branch transformer couples a portion of the branch rectifier output to the control electrode of the succeeding branch rectifier. The transformer secondary of the last of the said plurality of branches couples a portion of said last branch rectifier device output to the control electrode of the rectifier device in the first of said plurality of branches, whereby the conduction of each branch is responsive to the conduction of the other branches.

According to another aspect of the invention, each branch transformer primary winding is connected between the branch rectifier device output and the load. Each branch rectifier device input is connected to the source. One end of said branch transformer secondary is connected to the load and the other end of said branch secondary winding is connected to the control electrode of the succeeding branch rectifier device.

According to yet another aspect of the invention, the transformer secondary winding is poled to increase the drive of the succeeding branch rectifier device control electrode responsive to the increase in conduction of its branch rectifier device.

According to yet another aspect of the invention, each rectifier device comprises a transistor having an emitter, base, and a collector. The collector is connected to the load through a transformer primary winding. The emitter is connected to the source, and the base is connected to the secondary winding of the preceding branch transformer.

According to yet another aspect of the invention, the rectifier circuit comprises a pair of branches. In each branch, the rectifier transistor emitter is connected to the source. The rectifier transistor collector is connected to the load through a transformer primary winding, and the transformer secondary winding is connected between the load and the rectifier transistor base of the other branch. The branch secondary windings are poled so that the conduction of one branch rectifier transistor responsive to the polarity of the voltage applied to the source causes the other branch rectifier device to conduct. In this manner, the current passed through the rectifier is shared between the two branches.

In an embodiment illustrative of the invention, a rectifier comprising a plurality of paralleled regeneratively coupled rectifier transistor circuits is connected between one terminal of an a.c. source and a terminal of a d.c. load circuit including a power supply filter. Each circuit transistor emitter is connected to the source terminal and each circuit transistor collector is connected to the load terminal through a transformer primary winding. The circuit transformer secondary winding is connected between the load terminal and the base electrode of the next paralleled rectifier transistor. The transformer secondary of the last of the plurality of paralleled transistor circuits is connected to the base electrode of the first of the plurality of paralleled transistor circuits. When the polarity of the a.c. source terminal is such that one of the paralleled transistors conducts, a signal proportional to the magnitude of the current through said conducting transistor is coupled via the circuit transformer to the base of the next paralleled transistor to drive said next transistor into conduction. In this manner, all of the paralleled transistor circuits are rendered conductive.

DESCRIPTION OF THE DRAWING

FIG. 1 depicts an embodiment illustrative of the invention in which a plurality of paralleled transistor circuits form a half-wave rectifier between an a.c. source and a load;

FIG. 4 depicts another embodiment illustrative of the invention wherein equalizing transformer coupling is utilized; and FIG. 5 depicts another embodiment illustrative of the invention in which NPN transistors are utilized.

DETAILED DESCRIPTION

Figure 2:
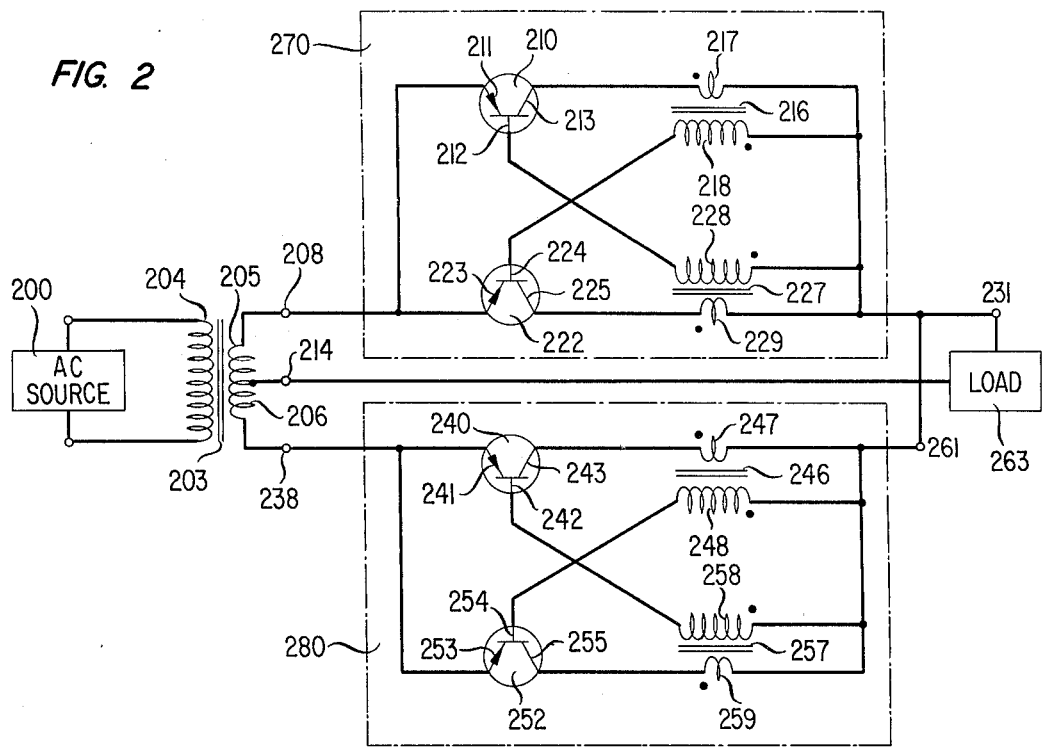
FIG. 2 depicts another embodiment illustrative of the invention in which a pair of rectifiers including paralleled PNP transistor rectifier circuits provide full-wave rectification of an a.c. source.

Referring to FIG. 1, a.c. source 101 is connected to load 105 via rectifier 103. Rectifier 103 provides half-wave rectification well known in the art. In rectifier 103, a plurality of branch circuits, 107-1 through 107-n, are connected in parallel whereby the load current through the rectifier is shared by circuits 107-1 through 107-n. Each branch circuit comprises a transistor having an emitter connected to the a.c. source and a collector connected to the load via a coupling device. Circuit 107-1, for example, includes transistor 109-1 whose emitter 111-1 is connected to a.c. source 101 via terminal 150. Collector 113-1 of transistor 109-1 is connected via lead 120-1 to coupling device 115-1. Lead 117-1 connects coupling device 115-1 to load 105 via terminal 152. Base 114-1 of transistor 109-1 is connected to coupling device 115-n of circuit 107-n via lead 118-n. Each of the other rectifier branches is substantially similar to circuit 107-1, and the transistor base of each branch circuit is connected to the coupling device of the preceding branch circuit. Thus, the conduction of the transistor of a particular branch circuit is made responsive to the conduction of the other branch circuits.

When a.c. source 101 applies a positive potential to rectifier 103, one or more of branch circuits 107-1 through 107-n conducts. The order of conduction and the degree of conduction of each branch circuit is a function of the transistor characteristics and the coupling device characteristics in the branch circuits. Assume for purposes of illustration, that circuit 107-1 conducts first. This conduction is obtained by the forward biasing of the emitter base junction of transistor 109-1. Current from base electrode 114-1 flows through device 115-n to load 105 whereby conduction of the emitter collector path of transistor 109-1 is sustained. The current from collector electrode 113-1 passes through coupling device 115-1 to load 105.

A negative voltage is obtained on lead 118-1 when current from collector 113-1 passes through coupling device 115-1. This negative voltage increases the forward bias of the emitter base path of transistor 109-2 in circuit 107-2. Responsive to the current flowing from emitter 111-2 to base 114-2, current flows in the emitter collector path of transistor 109-2 through device 115-2 to load 105. In this way, the current through the rectifier is shared by circuits 107-1 and 107-2. Circuit 107-2 is connected through similar intermediate circuits, not shown, to circuit 107-m. Responsive to the conduction of the intermediate circuits, circuit 107-m conducts and causes a negative voltage signal to be applied to base 114-n of transistor 109-n. Transistor 109-n is then biased into conduction so that circuit 107-n conducts a portion of the load current.

The negative signal obtained on lead 118-n from coupling device 115-n is regeneratively coupled to base 114-1 in circuit 107-1. In this manner, conduction of each of circuits 107-1 through 107-n is assured, even though the characteristics of each circuit transistor and each circuit coupling device may be different. The load current passing through rectifier 103 during the positive half-cycle of a.c. source voltage 101 is then divided among branch circuits 107-1 through 107-n. Differences in current among the branch circuits are substantially reduced by the parallel connection and the regenerative coupling among the branch circuits. During the negative half-cycle of source 101, all branch circuits are reverse biased and nonconductive.

In FIG. 2, a.c. source 200 is coupled to load 263 via transformer 203 and the full-wave rectifier arrangement comprising rectifiers 270 and 280. Primary winding 204 receives the a.c. voltage from source 200 and secondary windings 205 and 206 provide opposite polarity a.c. voltages of magnitudes appropriate for load 263. Terminals 208 and 231 connect winding 205 to load 263 via rectifier 270, and terminals 238 and 261 connect winding 206 to load 263 via rectifier 280. Load 263 is also connected to windings 205 and 206 via terminal 214.

During a portion of the cycle when the voltage on winding 205 is positive, the voltage on winding 206 is negative. The negative voltage at terminal 238 reverse biases transistors 240 and 252 so that no current flows through rectifier 280. The positive voltage on terminal 208 forward biases one of transistors 210 and 222 so as to render it conductive. Assume for purposes of illustration that transistor 210 conducts first. Current flows from emitter 211 to base 212 and through winding 228 of transformer 227 to load 263. Responsive to the forward biasing of emitter 211, transistor 210 is rendered conductive and a much larger current flows from emitter 211 to collector 213. The collector current from transistor 210 flows through winding 217 of transformer 216 and therefrom to load 263. Winding 217 may be a single-turn winding to reduce the circuit impedance and to simplify the construction of transformer 216. As a result of current through winding 217, a negative voltage is induced in winding 218, which negative voltage forward biases transistor 222 so that transistor 222 is rendered conductive. Load current flows through the emitter collector path of transistor 222 and from collector 225 through winding 229 to load 263. Winding 229 may be a one-turn winding, as is winding 217. The current through winding 229 induces a negative voltage in winding 228 which operates to assure forward conduction of transistor 210. In this way, both transistors 210 and 222 conduct during the positive half-cycle and differences in the conduction of the transistors are equalized between transistors 210 and 222 by means of the parallel connection and feedback arrangement including transformers 227 and 216.

Upon termination of the positive half-cycle, transistors 210 and 222 of rectifier 270 are reverse biased by the negative-going voltage on terminal 208 from winding 205. At this time, a positive-going voltage on terminal 238 from winding 206 is applied to rectifier 280. Responsive to the positive voltage on terminal 238, one of rectifier transistors 240 and 252 is forward biased. Assume that transistor 252 is forward biased so that current flows from emitter 253 to base 254 and therefrom through winding 248 to load 263. Transistor 252 is thereby rendered conductive, and current flows through the emitter collector path of transistor 252 and one-turn winding 259 of transformer 257 to load 263. Responsive to the current through winding 259, a negative voltage is induced in winding 258 which forward biases the emitter base junction of transistor 240. Transistor 240 conducts and provides current to load 263 via its emitter collector path and one-turn winding 247 of transformer 246. The negative voltage induced in winding 248 of transformer 246 responsive to the current flow through winding 247 assures forward biasing of transistor 252. In this manner, both transistors 240 and 252 conduct during the negative half-cycle of the voltage from source 200 whereby the total current in rectifier 280 is shared by transistors 240 and 252. The parallel connection and the coupling between transistors 240 and 252 through transformers 246 and 257 serves to equalize the sharing of current between transistors 240 and 252.

Figure 3:
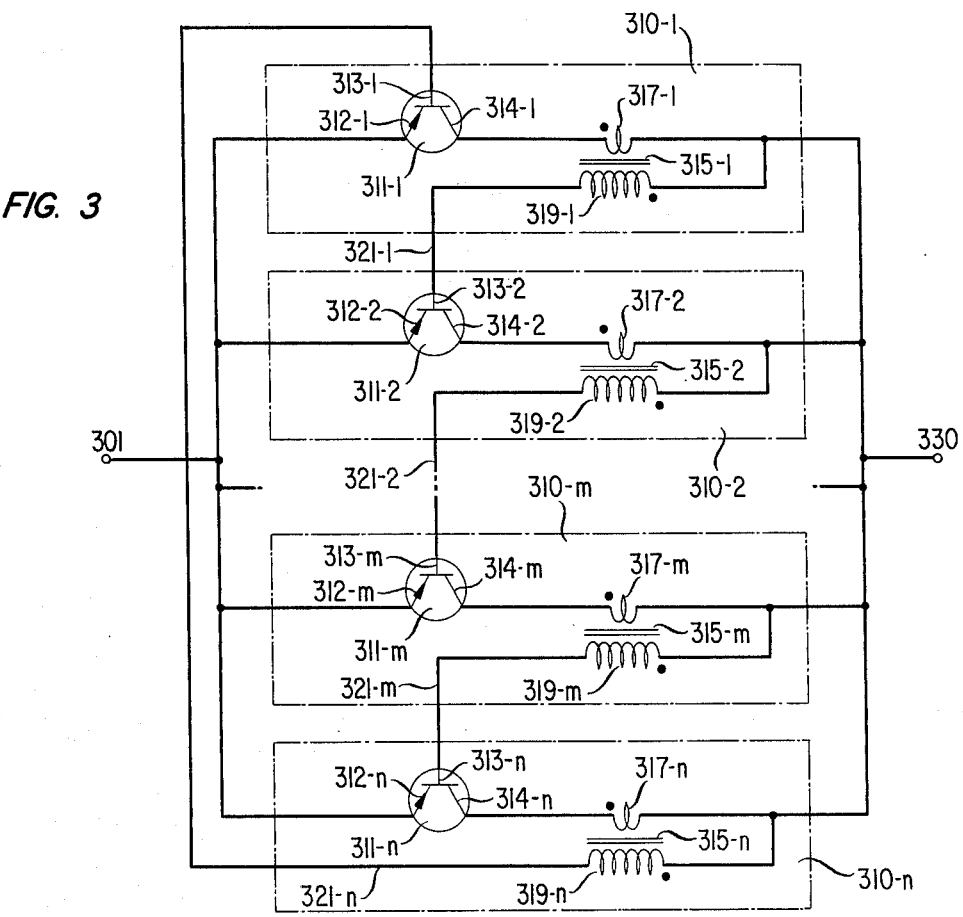
FIG. 3 depicts a rectifier circuit illustrative of the invention.

FIG. 3 shows a rectifier such as may be used as rectifier 270 or 280 in FIG. 2, but the rectifier of FIG. 3 includes more parallel branches (310-1 through 310-n) so that a much larger rectifier current can be sustained than in the rectifiers of FIG. 2. Each rectifier branch, for example, branch 310-1, includes PNP transistor 311-1 and a transformer 315-1. Emitter 312-1 of transistor 311-1 is connected to source terminal 301. Collector 314-1 of transistor 311-1 is connected via one-turn winding 317-1 to load terminal 330. Base electrode 313-1 of transistor 311-1 is connected to transformer winding 319-n via lead 321-n, and one end of transformer winding 319-1 is connected to base 313-2 of branch 310-2 via lead 321-1. The other end of winding 319-1 is connected to load device terminal 330. The transistor base of each branch is connected to the coupling transformer of the preceding branch so that the branches are all regeneratively coupled.

After the voltage at terminal 301 becomes positive, a positive bias is placed on the transistor emitter of each branch circuit. Assume for purposes of illustration that transistor 311-n of branch 310-n conducts first. Current passes through emitter 312-n, the emitter base path of transistor 311-n, and from base 313-n through winding 319-m to load terminal 330. Current also passes from emitter 312-n to collector 314-n and therefrom through one-turn winding 317-n of transformer 315-n to load terminal 330. Responsive to the current in one-turn winding 317-n, a negative voltage is induced in winding 319-n, which negative voltage is applied via lead 321-n to base 313-1 in branch circuit 310-1.

The negative voltage at base 313-1 from winding 319-n causes transistor 311-1 to conduct and current from collector 314-1 is supplied to load terminal 330 through one-turn winding 317-1. The negative voltage induced in winding 319-1 is then supplied to base 313-2 in succeeding branch circuit 310-2 via lead 321-1, whereby transistor 311-2 conducts and supplies current to load terminal 330 via transformer winding 317-2. In similar fashion, branch circuit 310-m is made operative through intermediate branch circuits (not shown) and the negative voltage induced in winding 319-m is supplied to base 313-n in branch circuit 310-n whereby the regenerative coupling loop is completed. In this way, conduction of all the branch circuits of the rectifier of FIG. 3 is assured. The parallel connection in combination with regenerative coupling operates to reduce the differences in load current flowing through each branch so that the load current is shared by each of the rectifier branch circuits 310-1 through 310-n. When the voltage on terminal 301 becomes negative, the transistors of branches 310-1 through 310-n become reverse biased whereby no current is conducted therethrough to load terminal 330 in accordance with the well-known principles of rectifier operation.

FIG. 4 shows a rectifier using four branch circuits arranged in pairs. The branch circuit including transistor 420 and transformer 427 is paired with the branch circuit including transistor 432 and transformer 437. In similar fashion, the branch circuit including transistor 442 and transformer 457 is paired with the branch circuit including transistor 450 and transformer 463. Regenerative coupling between transistors 420 and 432 is completed via leads 425 and 426, and regenerative coupling between transistors 442 and 450 is completed via leads 470 and 471. Transformer 411 is included to equalize the voltages across the two pairs of branch circuits.

In operation, a positive voltage appearing at source terminal 401 is applied to the emitters of each branch circuit through the equalizing transformer 411. The positive voltage at terminal 401 is supplied to emitters 421 and 433 via transformer winding 413. Similarly, the positive voltage at terminal 401 is supplied to emitters 443 and 451 via winding 415. Transformer 411 operates as an equalizing transformer. Its windings, 413 and 415, have an equal number of turns. The voltage induced in winding 413 is equal to the voltage induced in winding 415 and these windings are poled so that the induced voltages are of opposite polarity with respect to terminal 401. This arrangement provides compensation for any voltage difference across the two pairs of branch circuits and assures that the current entering one pair is equal to the current entering the other pair.

In operation, the circuit of FIG. 4 provides current load sharing among transistors 420, 432, 442, and 450. Assume that transistor 420 conducts first upon the application of a positive voltage at terminal 401. The current through transformer winding 413 resulting from the conduction of transistor 420 gives rise to an equal current in winding 415 which provides drive to either transistor 442 or transistor 450. Current through transistor 420 is supplied to load terminal 430 via single-turn winding 428 of transformer 427. The current in winding 428 induces a negative voltage across multiturn secondary winding 429, which negative voltage is applied to base 435 via lead 426. The conduction of transistor 432 resulting from the voltage applied to base 435 provides current to the load through the emitter collector path of transistor 432 and one-turn primary winding 439. The negative voltage induced in multiturn winding 438 then provides a negative voltage to assure continued conduction of transistor 420 via lead 425. Any remaining differences in conduction between transistors 420 and 432 are further reduced by the parallel connections combined with the regenerative coupling.

The conduction of transistor 442 provides current to load terminal 430 via one-turn winding 458. The negative voltage induced in multiturn winding 459 is supplied to base 453 via lead 470. As a result of the negative voltage on base 453, transistor 450 is rendered conductive and the emitter collector current of transistor 450 is supplied to load terminal 430 via one-turn winding 465. A negative voltage is induced in multiturn winding 464, which negative voltage is supplied to base 445 through lead 471 so that transistor 442 remains conductive. Differences in conduction between transistors 442 and 450 are minimized by the parallel connections and the regenerative coupling. When the voltage at source terminal 401 becomes negative, the emitter base circuits of transistors 420, 432, 442, and 450 are reverse biased whereby these transistors are rendered nonconductive and current flow to load terminal 430 ceases.

FIG. 5 shows a rectifier using two regeneratively coupled branch circuits. One branch circuit comprises NPN transistor 505 and transformer 520, and the other branch circuit comprises NPN transistor 510 and transformer 525. Emitters 506 and 511 are connected to a.c. source terminal 501. Collector 507 is connected to load terminal 530 via single-turn winding 521, and collector 512 is connected to load terminal 530 via single-turn winding 527. Secondary winding 522 is connected between base 512 and load terminal 530, while secondary winding 526 is connected between base 508 and load terminal 530.

The application of a negative voltage to terminal 501 causes one of transistors 505 and 510 to conduct. Assume, for purposes of illustration, that transistor 505 conducts first. Current flows through the base emitter path of transistor 505 from terminal 530 via winding 526 to terminal 501. Current then flows from terminal 530 through single-turn transformer winding 521 and therefrom through the collector emitter path of transistor 505 to terminal 501. As a result of the current flow through winding 521, a positive voltage is induced in multiturn secondary winding 522, which positive voltage is applied to base 513 of transistor 510. This positive base current causes transistor 510 to conduct so that current flows from load terminal 530 through single-turn primary winding 527 and the collector emitter path of transistor 510 to source terminal 501.

A positive voltage is induced in multiturn winding 526, which positive voltage assures continued conduction of transistor 505. Thus, transistors 505 and 510 are both conductive. The parallel connection and the regenerative coupling arrangement minimizes the differences in the currents through transistors 505 and 510. When the voltage at terminal 501 becomes positive, the emitter base paths of transistors 505 and 510 are reverse biased whereby no current flows through the rectifier.

It is to be understood that the foregoing arrangements are merely illustrative of the principles of the invention. Numerous other arrangements may be devised by those skilled in the art without departing from the scope and spirit of the invention. For example, the NPN transistor circuit arrangement of FIG. 5 may be modified to include more than two paralleled rectifier branches.

What is claimed is:

1. A rectifier circuit comprising a plurality of parallel branches connected between first and second terminals, each branch comprising a controllable rectifier device having input, output, and control electrodes and a coupling device connected between said output electrode and said second terminal and to the control electrode of the succeeding branch, said rectifier device input electrode being connected to said first terminal, said coupling device being adapted to couple a signal corresponding to the conduction of said branch to the control electrode of the succeeding branch, the coupling device of the last of said branches being connected between the last branch output electrode and said second terminal and to the control electrode of the first of said parallel branches and being adapted to couple a signal corresponding to the conduction of said last branch to the control electrode of the first of said parallel branches.

2. A rectifier circuit according to claim 1 wherein said coupling device comprises a transformer including a primary winding connected between said output electrode and said second terminal and a secondary winding connected between the control electrode of said succeeding branch and said second terminal, the transformer secondary winding of said last branch being connected between the control electrode of said first branch and said second terminal.

3. A rectifier circuit according to claim 2 wherein each secondary winding is poled to produce conduction of the controllable rectifier device to which said secondary winding is connected.

4. A rectifier circuit according to claim 3 wherein each controllable rectifier device comprises a transistor having an emitter, a base, and a collector, said emitter being connected to said first terminal, said collector being connected to said primary winding, and said base being connected to the transformer secondary winding of the preceding parallel branch.

5. A rectifier circuit according to claim 4 wherein each primary winding comprises a single turn and each secondary winding comprises multiple turns and further comprising an a.c. source and a load device, said first terminal being connected to said a.c. source and said second terminal being connected to said load device.

6. A rectifier circuit according to claim 4 wherein each transistor is of the PNP conductivity type.

7. A rectifier circuit according to claim 4 wherein each transistor is of the NPN conductivity type.

8. A rectifier comprising first and second parallel branches each connected between first and second terminals, each branch comprising a transistor having emitter, base, and collector electrodes and a transformer comprising a primary winding and a secondary winding, said emitter electrode being connected to said first terminal and said collector electrode being connected to said second terminal through said primary winding, said second branch base electrode being connected to one end of said first branch secondary winding, the other end of said first branch secondary winding being connected to said second terminal, said first branch base electrode being connected to one end of said second branch secondary winding, and the other end of said second branch secondary winding being connected to said second terminal.

9. A rectifier according to claim 8 wherein each transformer primary winding comprises a single turn, and each transformer secondary winding comprises a plurality of turns, and each transformer secondary winding is poled to produce a signal to forward bias the transistor to which it is connected responsive to the conduction of the transformer branch.

10. In combination, an a.c. power source, a load device, and a rectifier circuit connected between said source and said load device, said rectifier circuit comprising at least one rectifier including a plurality of parallel branch circuits, each branch circuit comprising a controllable rectifier device having first, second, and control electrodes and a transformer comprising first and second windings, said first electrode being coupled to said source, said second electrode being connected to said load through said first winding, one end of said second winding being connected to the control electrode of the succeeding branch, the other end of said second winding being connected to said load device, one end of the second winding of the last of said parallel branches being connected to the control electrode of the first of said parallel branches and the other end of said last branch secondary winding being connected to said load device, whereby the conduction of each branch is responsive to the conduction of the other parallel branches.

11. The combination according to claim 10 wherein each controllable rectifier device comprises a transistor having an emitter, a collector, and a base, said emitter corresponding to said first electrode, said collector corresponding to said second electrode, and said base corresponding to said control electrode, said transformer first winding comprises a single turn and said transformer second winding comprises a plurality of turns, said second winding being poled to apply a forward biasing signal to the base of the transistor of the succeeding branch circuit.

12. A half-wave rectifier circuit comprising an a.c. source having first and second terminals, a load device having third and fourth terminals, and a rectifier connected between said first and third terminals, said rectifier comprising a plurality of parallel branches, each branch including a transistor having an emitter, a base, and a collector and a transformer comprising a single-turn primary winding and a multiple-turn secondary winding, said emitter being connected to said first terminal, said collector being connected to said third terminal through said primary winding, one end of said secondary winding being connected to the base of the succeeding branch and the other end of said secondary winding being connected to said third terminal, and one end of the secondary winding of the last of said parallel branches being connected to the base of the first of said parallel branches.

13. A full-wave rectifier circuit comprising an a.c. source having first, second, and return terminals, a load device having third and fourth terminals, and a first rectifier connected between said first and third terminals, said fourth terminal being connected to said a.c. source return terminal, said first rectifier comprising a plurality of parallel first branches, each first branch including a transistor having an emitter, a base, and a collector and a transformer comprising a single-turn primary winding and a multiple-turn secondary winding, said emitter being connected to said first terminal, said collector being connected to said third terminal through said primary winding, one end of said secondary winding being connected to said third terminal and the other end of said secondary winding being connected to the base of the succeeding first branch, the other end of the secondary winding of the last of said parallel first branches being connected to the base of the first of said parallel first branches.

14. A full-wave rectifier circuit according to claim 13 further comprising a second rectifier connected between said second and third terminals, said second rectifier including a plurality of parallel second branches, each second branch comprising a transistor having an emitter, a base, and a collector, and a transformer including a single-turn primary winding and a multiple-turn secondary winding, each second branch emitter being connected to said second terminal, each second branch collector being connected to said third terminal through said second branch primary winding, one end of each second branch secondary winding being connected to said third terminal, the other end of each second branch secondary winding being connected to the base of the succeeding second branch and the other end of the secondary winding of the last of said second branches being connected to the base of the first one of said parallel second branches.

* * * * *